US009156546B2

(12) United States Patent
Irwin, III et al.

(10) Patent No.: US 9,156,546 B2
(45) Date of Patent: Oct. 13, 2015

(54) ACTIVE-INCEPTOR TACTILE-CUEING HANDS-OFF RATE-LIMIT

(75) Inventors: Joseph G. Irwin, III, Landenberg, PA (US); Pieter G. Einthoven, West Chester, PA (US); David G. Miller, Mt. Laurel, NJ (US); Mark S. Spano, Princeton, NJ (US)

(73) Assignee: THE BOEING COMPANY, Chicago, IL (US)

( * ) Notice: Subject to any disclaimer, the term of this patent is extended or adjusted under 35 U.S.C. 154(b) by 1280 days.

(21) Appl. No.: 12/046,356

(22) Filed: Mar. 11, 2008

(65) Prior Publication Data

US 2009/0234518 A1  Sep. 17, 2009

(51) Int. Cl.
*B64C 27/56*  (2006.01)
*B64C 13/10*  (2006.01)
*B64C 13/46*  (2006.01)

(52) U.S. Cl.
CPC ............... *B64C 27/56* (2013.01); *B64C 13/10* (2013.01); *B64C 13/46* (2013.01)

(58) Field of Classification Search
CPC ........ B64C 13/00; B64C 13/04; B64C 13/06; B64C 13/16; B64C 13/50; B64C 13/503; B64C 27/56
USPC .............. 701/1, 4, 36, 42; 244/193, 197, 220, 244/223
See application file for complete search history.

(56) References Cited

U.S. PATENT DOCUMENTS

| 3,337,163 | A | * | 8/1967 | Frudenfeld | .................... 244/197 |
| 4,150,803 | A | * | 4/1979 | Fernandez | ................ 244/135 A |
| 5,076,517 | A | * | 12/1991 | Ferranti et al. | ................ 244/228 |
| 5,347,204 | A | * | 9/1994 | Gregory et al. | ............... 318/632 |

(Continued)

FOREIGN PATENT DOCUMENTS

WO     WO 03040844 A3 *  5/2003

OTHER PUBLICATIONS

Einthoven, et al., "The HACT Vertical Controller", Presented at the American Helicopter Society 58th Annual Forum, Montreal, Jun. 11-13, 2002, American Helicopter Society, Inc.

(Continued)

*Primary Examiner* — John Q Nguyen
*Assistant Examiner* — Michael Whalen
(74) *Attorney, Agent, or Firm* — Toler Law Group, PC (57) ABSTRACT

The system contains the active inceptor having mobility in a first direction. A feedback mechanism is in communication with the active inceptor. The mechanism provides a variable level of force to the active inceptor in the first direction. A programmable device communicates with the feedback mechanism. The programmable device controls the level of force provided to the active inceptor from the feedback mechanism. The programmable device is capable of recognizing and distinguishing between regimes wherein the operator is physically engaging the inceptor ("hands-on" state) and when the operator is "hands-off" the inceptor. The programmable device limits the maximum rate of displacement of an active inceptor to a specified safe and effective value regardless of changes in forces applied by the variable force feel feedback mechanism. The limit on rate of change of active inceptor position is varied based on the recognized "hands-on" or "hands-off" state and the type of tactile cue to satisfy otherwise conflicting requirements for failure robustness and effective tactile cueing during highly dynamic operations.

18 Claims, 4 Drawing Sheets

(56) References Cited

U.S. PATENT DOCUMENTS

| | | | |
|---|---|---|---|
| 5,412,299 A * | 5/1995 | Gregory et al. | 318/628 |
| 6,459,228 B1 * | 10/2002 | Szulyk et al. | 318/632 |
| 6,679,458 B2 * | 1/2004 | Einthoven et al. | 244/223 |
| 6,735,500 B2 * | 5/2004 | Nicholas et al. | 701/3 |
| 7,285,932 B2 * | 10/2007 | A'Harrah | 318/638 |
| 7,658,349 B2 * | 2/2010 | Abel et al. | 244/223 |
| 8,025,256 B2 * | 9/2011 | Miller et al. | 244/194 |
| 8,050,780 B2 * | 11/2011 | Tessier et al. | 700/63 |
| 8,271,151 B2 * | 9/2012 | Hasan et al. | 701/3 |
| 2002/0068628 A1 * | 6/2002 | Takatsuka et al. | 463/40 |
| 2003/0226937 A1 * | 12/2003 | Einthoven et al. | 244/236 |
| 2004/0010354 A1 * | 1/2004 | Nicholas et al. | 701/4 |
| 2005/0080495 A1 * | 4/2005 | Tessier et al. | 700/63 |
| 2006/0284021 A1 * | 12/2006 | A'Harrah | 244/195 |
| 2007/0164168 A1 * | 7/2007 | Hirvonen et al. | 244/223 |
| 2008/0234881 A1 * | 9/2008 | Cherepinsky et al. | 701/7 |
| 2009/0062973 A1 * | 3/2009 | Caldeira et al. | 701/6 |
| 2009/0143110 A1 * | 6/2009 | Armstrong | 455/566 |
| 2009/0178503 A1 * | 7/2009 | Hanlon et al. | 74/471 XY |
| 2009/0266939 A1 * | 10/2009 | Hanlon et al. | 244/223 |
| 2009/0266940 A1 * | 10/2009 | Miller et al. | 244/223 |
| 2009/0302171 A1 * | 12/2009 | Wilkens | 244/223 |
| 2010/0011897 A1 * | 1/2010 | Kopp | 74/471 XY |
| 2010/0071496 A1 * | 3/2010 | Hanlon et al. | 74/471 XY |
| 2010/0085208 A1 * | 4/2010 | Murakoshi | 340/825.36 |
| 2011/0006154 A1 * | 1/2011 | Maresko et al. | 244/99.2 |
| 2011/0054720 A1 * | 3/2011 | Caldeira et al. | 701/6 |
| 2012/0053735 A1 * | 3/2012 | Tessier et al. | 700/275 |

OTHER PUBLICATIONS

Einthoven et al., "Energy Management", Presented at the American Helicopter Society Flight Controls and Crew Systems Design Specialists' Meeting, Philadelphia, PA, Oct. 9-11, 2002, American Helicopter Society, Inc.

* cited by examiner

ACTIVE-INCEPTOR TACTILE-CUEING HANDS-OFF RATE-LIMIT

FIELD

The present disclosure is generally related to active inceptors, and more particularly is related to safety protection for active inceptors.

BACKGROUND

An "inceptor" is a device that allows a human operator to control a machine. Examples of inceptors include the stick in an aircraft, a steering wheel in a car, the gloves sometimes used for robotic arms, or a joystick in a crane or other piece of construction equipment. An "active inceptor" means that a motor can move the stick/wheel/glove/joystick to provide feedback to the human operator.

The inceptor works by sensing or receiving the force applied by the human operator, then manipulating the machine accordingly. The displacement on the inceptor controls the machine. Whereas a mechanical system's force-versus-displacement and force-versus-velocity characteristics (i.e., passive inceptors) cannot be varied easily, using an active inceptor allows essentially instant reconfiguration of these characteristics. This allows the computer to add tactile cueing features like "soft stops" that indicate precisely and intuitively the position beyond which the inceptor should not be moved. A soft-stop introduces a relatively large incremental change in inceptor force beyond a specific inceptor position that a human operator perceives as a solid feeling stop. Although the incremental force change with position is relatively high at the soft stop, perhaps 5 pounds or so of incremental force change over a fraction of an inch of inceptor motion, the absolute value of inceptor force required to overcome the soft stop is still relatively low, perhaps 5 pounds or so of absolute force. Although a human operator can easily push past a soft stop when necessary, a properly designed soft stop eliminates the possibility of inadvertent movement of the inceptor beyond an operational limit. When a human operator intentionally pushes the inceptor through a soft stop, the relatively low level of soft stop force continues to cue the operator that a limit is being exceeded, but the level of soft stop force is low enough that the human operator can position the inceptor precisely with relatively low levels of muscular fatigue. Hard stops use the full force-generating capability of the motor, perhaps as much as 50 to 200 pounds of force, in an attempt to stop the operator from moving the inceptor any further when the computer identifies that a catastrophic failure may result.

As an example, motor vehicle steering wheels have traditionally been passive inceptors. The steering wheel may be turned until the mechanical limit for turning the wheels has been reached. The steering wheel may also kick when a vehicle drives over a pothole. The feedback is limited to the activity of the mechanical system. If the steering wheel is an active inceptor, it could be programmed to further limit turning of the steering wheel dependent upon the velocity of the motor vehicle to prevent rollovers. When the human-operator is not applying any force, the computer-calculated forces may provide feedback to the inceptor and cause the inceptor to move. Allowing the computer the ability to move the inceptor introduces a safety risk.

Active inceptors for aircraft including helicopters have been in development for years, but are just beginning to be introduced. For example, as applied to helicopters, active inceptors (or "active sticks") replace the helicopter's cockpit control springs and dampers, which otherwise provide "force-feel" on the collective and cyclic sticks, with electric motors and a computer to allow varying force on the stick. The active inceptor system allows the computers to communicate with the pilot through "tactile cues" in addition to the existing methods of cockpit displays and aural warnings. By moving communications from the cockpit displays to the pilot's hands, the pilot may be able to keep focus on activity outside the cockpit for safety and mission effectiveness.

However, these active inceptors must be able to move very fast and through the full range of travel. When the operator has his hands firmly on the controls, failure modes of active inceptors are fairly benign because the operator instantly senses the change in inceptor force caused by the failure and acts instinctively and biomechanically to inhibit undesirable movement of the inceptor. For typical aircraft applications, computer-controlled fast-moving actuators act in series with pilot inputs and have a limited range of travel to ensure failure robustness. Series actuators add or subtract control surface actuator motion "in series" with the control surface motion commanded by cockpit control inceptor inputs. Thus series actuator inputs do not result in motion of or forces exerted on the cockpit control inceptors. Series actuators behave conceptually like an "extensible link" in the path from cockpit controls to control surfaces. The series actuator or "extensible link" can extend or retract independently to move the control surfaces while the cockpit controls remain stationary. In contrast, parallel actuators exert force on the cockpit control inceptors manipulated by the pilot; hence they are referred to as "parallel" actuators because they exert forces on the control inceptors in parallel to the forces exerted by the pilot. Actuators with large travel typically act in parallel with pilot inputs and have limited rate capability to ensure failure robustness. This relationship between actuator speed and travel is a safety feature intentionally designed into aircraft such that no single computer-controlled actuator can cause excessive and unrecoverable vehicle motion before a human operator intervenes. In the case of Fly-By-Wire systems, high-bandwidth and full-authority swashplate actuators are limited in the control software to reproduce the limited-travel plus limited-speed safety feature. No such limiting has been applied to active-inceptor technology to address sensitivity to failures in hands-off operating conditions. Current active-stick technology development focuses on the advantages of the technology, not the safety features necessary for a production system.

SUMMARY

Embodiments of the present disclosure provide a system and method for rate limiting force feedback on an active inceptor to safe levels when the operator does not have his hands firmly on the inceptor. Briefly described, in architecture, one embodiment of the system, among others, can be implemented as follows. The system contains the active inceptor having mobility in a first direction. A feedback mechanism is in communication with the active inceptor. The mechanism provides a variable level of force to the active inceptor in the first direction. A programmable device communicates with the feedback mechanism. The programmable device controls the level of force provided to the active inceptor from the feedback mechanism. The programmable device recognizes and distinguishes between conditions wherein the human operator (1) has his hands firmly on the inceptor or (2) does not have his hands firmly on the inceptor ("hands-off") and limits the rate of change of active inceptor position due to force applied by the feedback mechanism accordingly. The programmable device also recognizes and distinguishes between conditions wherein the rate limited by the programmable device is variable, whereby the rate is not limited if the first sensor detects the user engaging the active inceptor and a first rate if the first sensor detects the user is not engaging the active inceptor, or between conditions wherein the rate limited by the programmable device is variable, whereby the rate limit is a first rate limit if the programmable device determines, from the information communicated by the second sensor and the memory, that the position of the active inceptor is at least proximate to one of the stored tactile-cue positions and a second rate limit if the programmable device determines, from the information communicated by the second sensor and the memory, that the position of the active inceptor is not proximate to at least one of the stored tactile-cue positions.

The present disclosure also can be viewed as providing methods for rate limiting force feedback on an active inceptor. In this regard, one embodiment of such a method, among others, can be broadly summarized by the following steps: providing a variable level of force from a feedback mechanism to the active inceptor in the first direction; communicating a first signal from a programmable device to the feedback mechanism, wherein the first signal controls the level of force provided to the active inceptor from the feedback mechanism; communicating a second signal from a programmable device to the feedback mechanism, wherein the second signal changes the level of force provided to the active inceptor from the feedback mechanism; and limiting a rate at which the level of force provided to the active inceptor is changed.

In another embodiment there is provided a method for rate limiting an active inceptor, which comprises the steps of: sensing active inceptor input; recognizing "hands-on" and "hands-off" operating regimes; setting a rate limit based on the sensed input; and limiting motion of the active inceptor based on the rate limit set. It should be recognized that the non-restrictive value of the rate limit applied in the "hands-on" operating regime would generally be unacceptable in the "hands-off" operating regime. Similarly, the value of the restrictive rate limit applied in the "hands-off" operating regime would generally be unacceptable in the "hands-on" operating regime. There is also provided a method wherein the rate limit is variable, wherein limiting the rate at which the level of force provided to the active inceptor is changed further comprises limiting the rate to a first rate if the detected position of the active inceptor is at least proximate to one of the stored tactile-cue positions and limiting the rate to a second rate if the detected position of the active inceptor is not at least proximate to one of the stored tactile-cue positions. Also provided is a method further comprising storing a plurality of tactile-cue positions in memory and assigning each of the tactile-cue positions a varying level of significance, wherein if the detected position of the active inceptor is at least proximate to one of the stored tactile-cue positions, the first rate is varied respective of the level of significance of the tactile-cue position.

The features, functions, and advantages that have been discussed can be achieved independently in various embodiments of the present invention or may be combined in yet other embodiments further details of which can be seen with reference to the following description and drawings. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
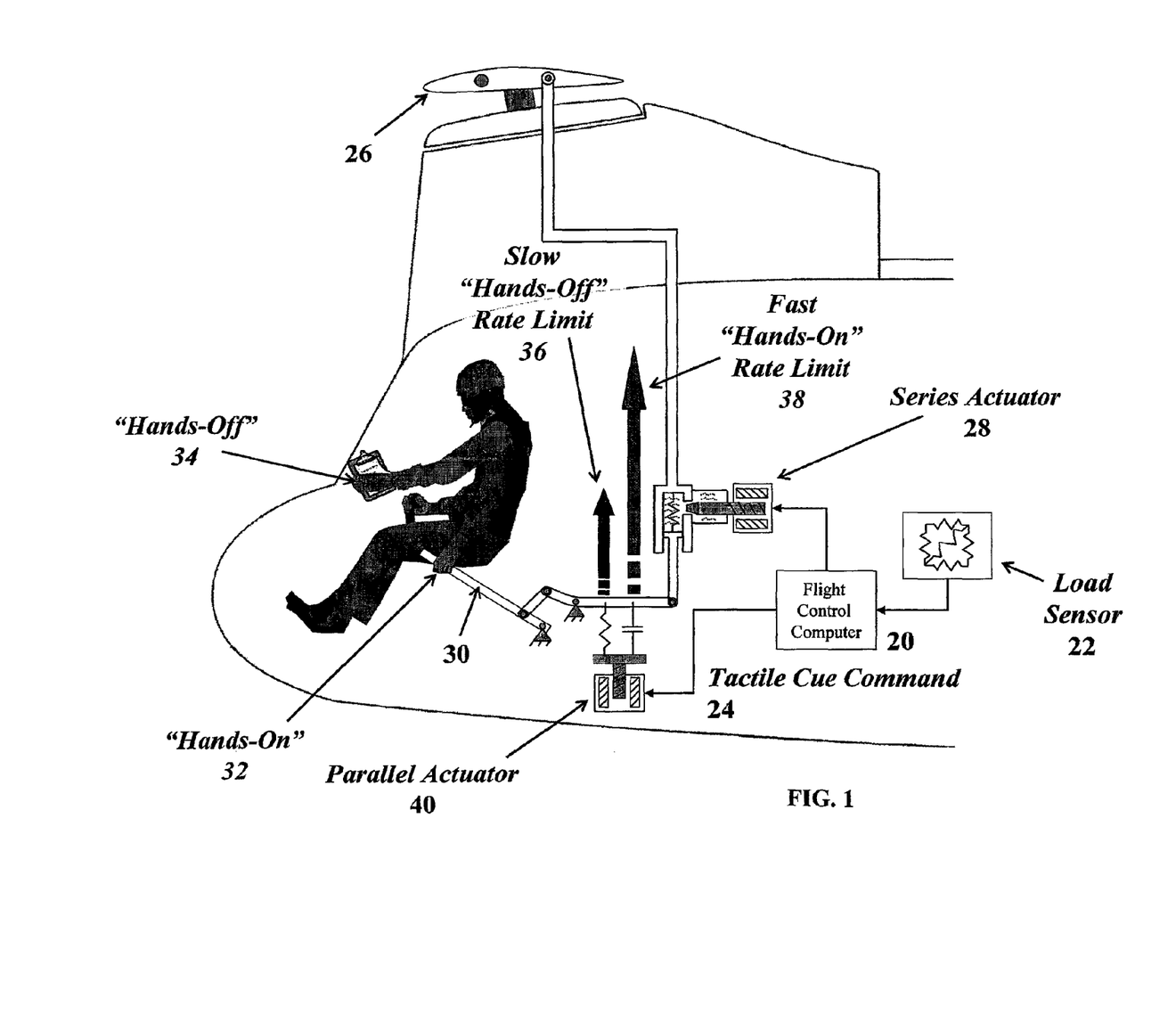
FIG. 1 is a schematic illustrating an exemplary embodiment of the disclosure.

FIG. 1 is a schematic illustrating the concept of operation of an active inceptor hands-off tactile cueing rate limit in the context of a structural load limiting tactile cueing system as applied to a helicopter. The Flight Control Computer 20 receives load information from the load cell sensor 22 to generate a tactile limit cue command 24 on a parallel actuator 40 that prevents the pilot from inadvertently commanding the aerodynamic control surface 26 to a position that exceeds the allowable limit load. A fast moving but limited travel series actuator 28 is also provided to enhance stability and aid in transient load limiting. The collective stick 30 is the active inceptor. In most cases, the pilot holds the inceptor in his hands in the "hands-on" state represented by position 32. However, there are instances when the pilot may take his hands off the inceptor briefly in steady flight conditions to perform routine tasks such as writing a note as illustrated by the "hands-off" state represented by position 34. When the pilot is operating in the "hands-off" state 34, there is generally no need for a tactile cue to move rapidly because the aircraft is in a relatively steady condition. Hence the time rate of change of a tactile cue driving the control inceptor 30, such as a tactile cue soft stop command 24 from the flight control computer, can be limited to the relatively slow 36 maximum rate without loss of performance. If an erroneous signal were to be received from the load sensor 22 while the pilot is operating in the hands-off state (34), the consequences of the failure would be mild because the relatively slow "hands-off" state rate limit 36 would prevent the inceptor 30 from moving very far before the pilot has a chance to respond to the failure. When the pilot is operating in the "hands-on" state 32, and there is need for the tactile limit cue command 24 to move rapidly in response to an aggressive pilot input or rapid change in aircraft flight condition, the fast "hands-on" state rate limit 38 is engaged to provide effective tactile limit cueing. While the preceding discussion addresses the possibility of an erroneous signal from the load cell sensor 22, it should be recognized that the possibility of an unforeseen or anomalous tactile cue command 24 from the relatively complex limit prediction and avoidance software implemented in the Flight Control Computer 20 must also be regarded as an extremely unlikely, but possible, functional hazard.

Figure 2:
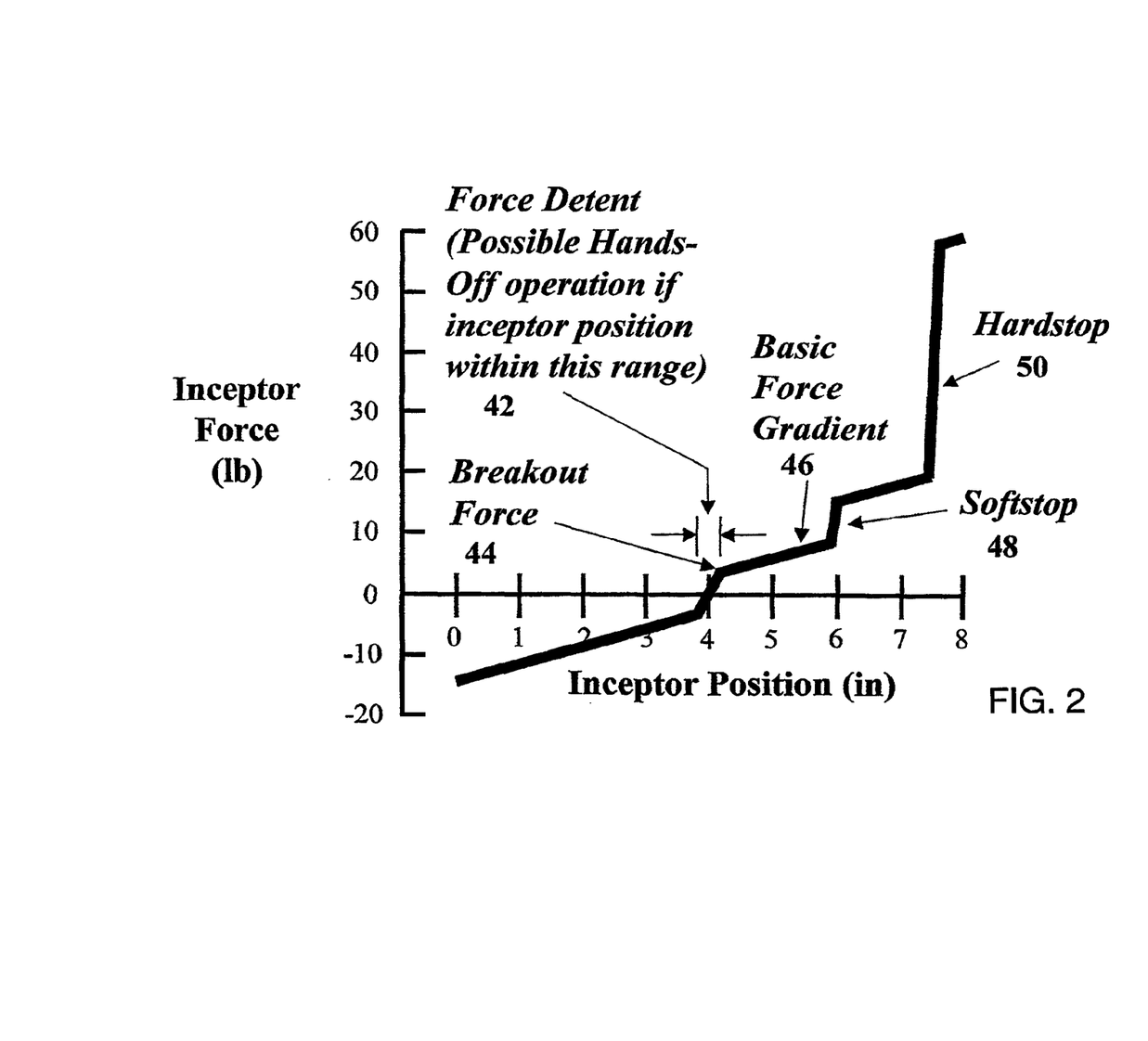
FIG. 2 is a plot of inceptor force and inceptor position.

FIG. 2 is a plot of example inceptor force feel characteristics such as force detent 42, breakout force 44, basic force gradient 46, and soft stop 48 and hardstop 50 tactile cueing profiles. The force detent position 42 is the position that the inceptor will return to if the operator applies no force to the inceptor. The breakout force 44 counters small force offsets such as friction, gravity, or acceleration forces to ensure that the inceptor will always return to a position within the range of the force detent 42 when the operator relaxes inceptor force or operates in a "hands-off" state. Hence a potential "hands-off" state operating regime can be recognized when the inceptor is located within the force detent range 42. When the operator has his "hands-on" the inceptor, he can move the inceptor outside of the detent by applying force to overcome the breakout force 44 and counter the effect of the basic inceptor force gradient profile 46. The tactile cue soft stop profile 48 indicates an inceptor position beyond which the inceptor should not be moved inadvertently. The tactile cue hardstop profile 50 acts to inhibit inceptor motion beyond a "never-exceed" position.

Figure 3:
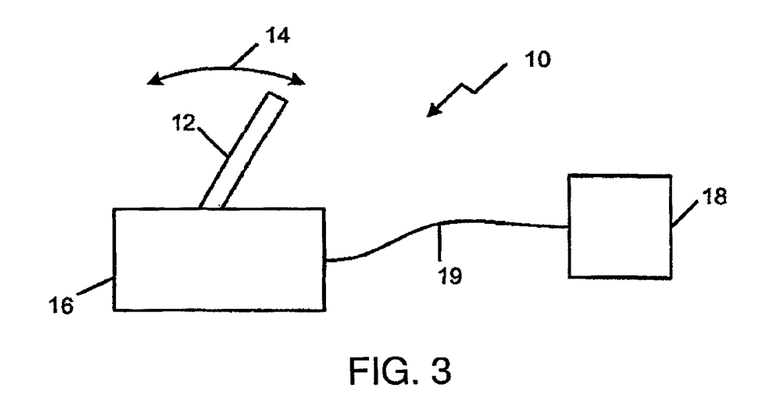
FIG. 3 is an illustration of a system for rate limiting force feedback on an active inceptor, in accordance with a first exemplary embodiment.

FIG. 3 is an illustration of a system 10 for rate limiting force feedback on an active inceptor 12, in accordance with a first exemplary embodiment. The system 10 contains the active inceptor 12 having mobility in a first direction 14. A feedback mechanism 16 is in communication with the active inceptor 12. The feedback mechanism 16, which may utilize, e.g., a motor or other structure such as, for example, a magnetic force feedback system, provides a variable level of force to the active inceptor 12 in the first direction 14. A programmable device 18 communicates with the feedback mechanism 16. The programmable device 18 controls the level of force provided to the active inceptor 12 from the feedback mechanism 16. The programmable device 18 limits the rate of change of the level of force provided to the active inceptor 12.

The active inceptor 12 may be mobile in a plurality of directions, although only a first direction 14 is shown in the illustration. The first direction 14, for example, may be rotational, linear, or angular. The first direction 14 may include both forward and back, which can be considered a negative of a forward direction, and is demonstrated by the dual arrows in FIG. 3.

The programmable device 18 may be a computer or similar device that is programmable at least for the purpose of exerting a level of control over the feedback mechanism 16. The programmable device 18 may be integral with the feedback mechanism 16, may be wirelessly connected to the feedback mechanism 16, or, as shown in FIG. 3, may be connected to the feedback mechanism by a wire 19. By limiting the rate of change of the level of force provided to the active inceptor 12, software or programs run on the programmable device 18 that suffer a glitch or unforeseen event, which would otherwise spike the force applied by the feedback mechanism 16, can be tempered. Even a split-second spike in force applied by the feedback mechanism 16 could cause a fatal fault in a motor vehicle if the spike were to occur when the operator has his "hands-off" the inceptor. Thus, the rate limit for changing force applied by the feedback mechanism 16 may be related to the associated risk of a significant application of force balanced against the risk associated with impeding the feedback mechanism 16 to allow the active inceptor to operate as intended. Fortunately, conditions where the pilot is "hands-off" the inceptor are steady, non-maneuvering flight conditions where a restrictive rate limit on inceptor force changes can be employed without impeding the tactile cueing capabilities of the feedback mechanism 16.

Figure 4:
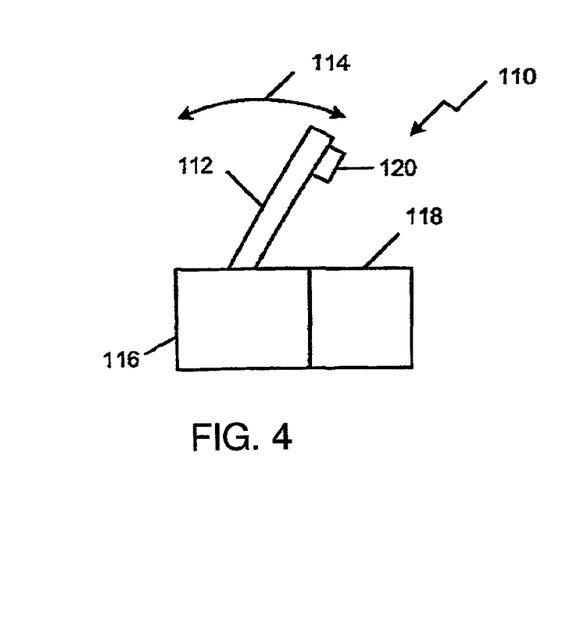
FIG. 4 is an illustration of a system for rate limiting force feedback on an active inceptor, in accordance with a second exemplary embodiment.

FIG. 4 is an illustration of a system 110 for rate limiting force feedback on an active inceptor 112, in accordance with a second exemplary embodiment. The system 110 contains the active inceptor 112 having mobility in a first direction 114. A feedback mechanism 116 is in communication with the active inceptor 112. The feedback mechanism 116 provides a variable level of force to the active inceptor 112 in the first direction 114. A programmable device 118 communicates with the feedback mechanism 116. The programmable device 118 controls the level of force provided to the active inceptor 112 from the feedback mechanism 116. The programmable device 118 limits the rate at which the level of force provided to the active inceptor 112 is changed.

The system 110 also includes a first sensor 120 in communication with the active inceptor 112 and the programmable device 118. The first sensor 120 detects whether a user is engaging the active inceptor 112. The first sensor 120 can be any of a number of constructs that would be devised by one having ordinary skill in the art, and may include, for example, a pressure sensor on the active inceptor 112, a heat sensor on the active inceptor 112, or a positional sensor that determines whether the active inceptor 112 is moving solely in response to the feedback mechanism 116. The first sensor 120 may also include a simple indicator of whether an autopilot is engaged.

If the first sensor 120 does not detect a user engaging the active inceptor 112, it may be useful to further limit a rate of change in the feedback force from the feedback mechanism 116, as it would suggest there is no human biomechanical or decision-making element to otherwise help temper preprogrammed decision-making of the programmable device 118. In this sense, the limit on the rate of change for the force of the feedback mechanism 116 may be variable, dependent on any of a number of situations. A first rate limit may be employed if the first sensor 120 detects the user engaging the active inceptor 112 ("hands-on" state) and a second rate may be employed if the first sensor 120 detects the user is not engaging the active inceptor 112 ("hands-off" state).

Figure 5:
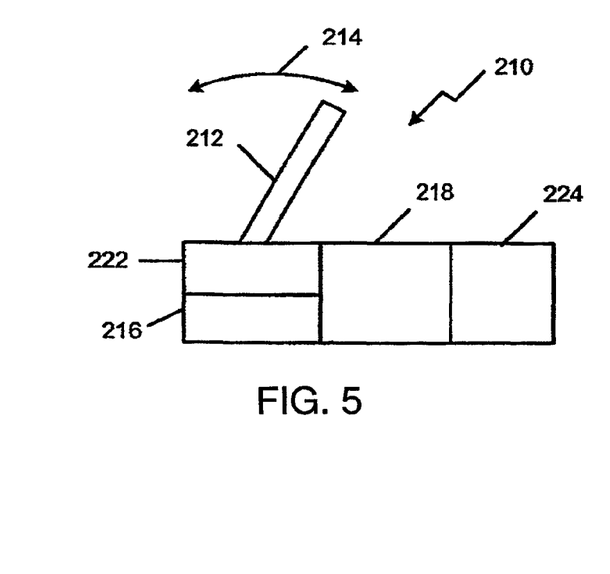
FIG. 5 is an illustration of a system for rate limiting force feedback on an active inceptor, in accordance with a third exemplary embodiment.

FIG. 5 is an illustration of a system 210 for rate limiting force feedback on an active inceptor 212, in accordance with a third exemplary embodiment. The system 210 contains the active inceptor 212 having mobility in a first direction 214. A feedback mechanism 216 is in communication with the active inceptor 212. The feedback mechanism 216 provides a variable level of force to the active inceptor 212 in the first direction 214. A programmable device 218 communicates with the feedback mechanism 216. The programmable device 218 controls the level of force provided to the active inceptor 212 from the feedback mechanism 216. The programmable device 218 limits a rate at which the level of force provided to the active inceptor 212 is changed.

The system 210 also includes a second sensor 222 in communication with the active inceptor 212 and the programmable device 218. The second sensor 222 detects a position of the active inceptor 212 relative to the first direction 214. A memory 224 is in communication with the programmable device 218. The memory 224 stores at least one tactile-cue position of the active inceptor 214. The programmable device 218 determines from information communicated by the second sensor 222 and the memory 224 whether the position of the active inceptor 212 is one of the stored tactile-cue positions. Tactile-cue positions may include hard stops (intended to avoid what could be a catastrophic human error with the active inceptor 212), soft stops (an easily overridable warning to the user that manually proceeding further with the active inceptor 212 could be dangerous) and detents (signaling to the user that certain thresholds are being crossed). The tactile-cue positions could be broken down into subcategories and other categories of tactile-cue positions may be devised by those having ordinary skill in the art.

The rate limited by the programmable device 218 may be variable. The rate limit may be a first rate limit if the programmable device 218 determines, from the information communicated by the second sensor 222 and the memory 224, that the position of the active inceptor 212 is one of the stored tactile-cue positions. The rate limit may be a second rate limit if the programmable device 218 determines, from the information communicated by the second sensor 222 and the memory 224, that the position of the active inceptor 212 is not one of the stored tactile-cue positions. The first rate limit may also be varied dependent upon the type of tactile-cue position identified. For instance, a hard stop may require more significant action than a soft stop and, as such, a hard stop may be less rate limited than a soft stop. Thus, the first rate limit may be varied respective of the significance of the tactile-cue position.

Amalgamations of the first, second, and third exemplary embodiments may be developed. For instance, the detent referenced in the third exemplary embodiment is a signal to a user that a specific threshold is being crossed. If, under the second exemplary embodiment, the system determines a user is not engaging the active inceptor, the purpose of the detent is obviated and may be avoided. Similarly, rate limits in the third exemplary embodiment may be modified dependent on whether a user is engaging the system, as discussed with regards to the second exemplary embodiment.

Figure 6:
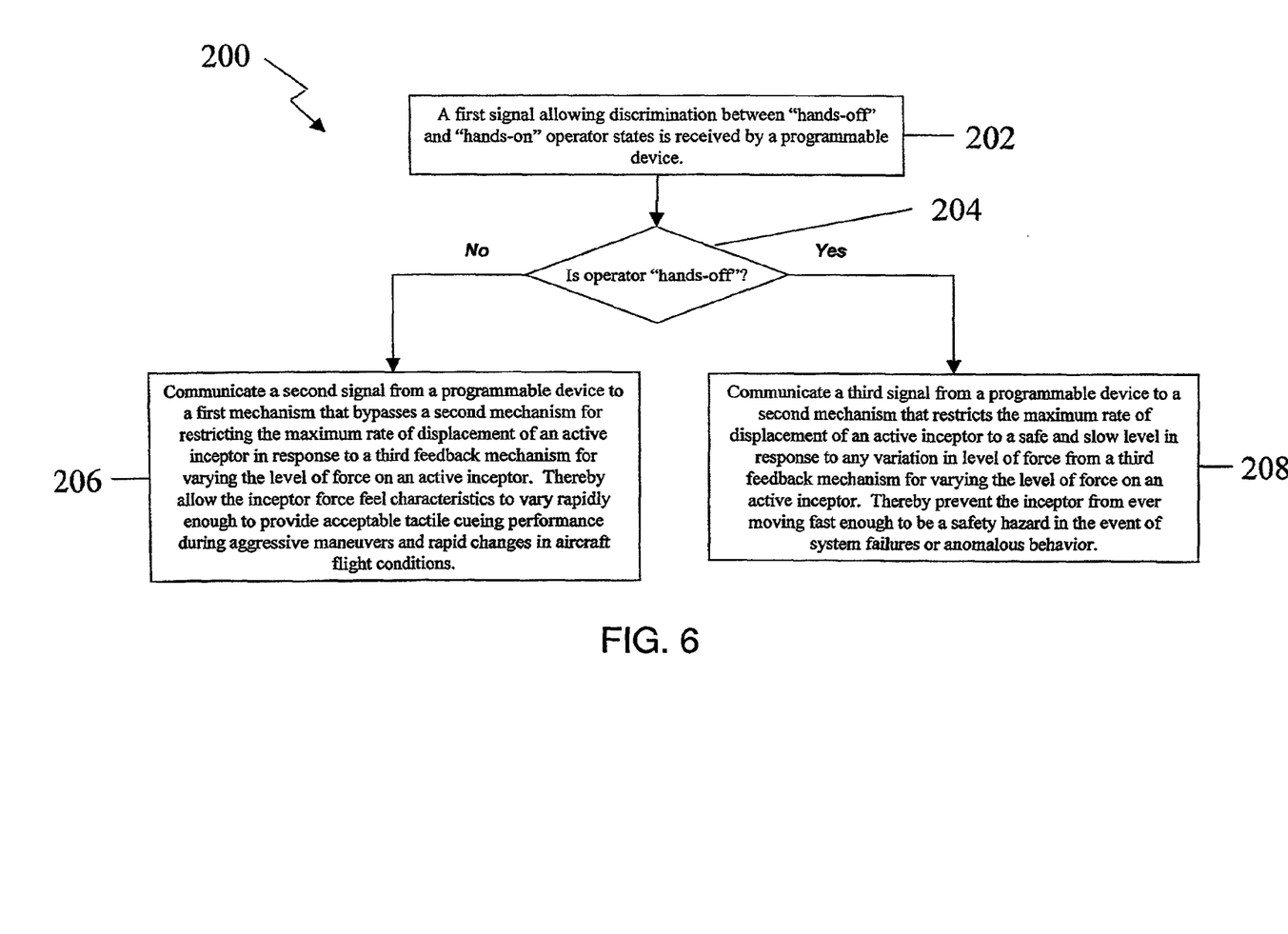
FIG. 6 is a flowchart illustrating a method for rate limiting force feedback on an active inceptor having mobility in a first direction in accordance with the first exemplary embodiment.

FIG. 6 is a flowchart 200 illustrating a method for rate limiting force feedback on an active inceptor 12 having mobility in a first direction 14 in accordance with the first exemplary embodiment. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown by block 202, a first signal allowing discrimination between "hands-off" and "hands-on" operating states is received by a programmable device. The signal is used in block 204 to decide if the operator is "hands-off" or "hands-on". If the operator is "hands-on", the actions in block 206 are taken. If the operator is "hands-off", the actions in block 208 are taken. As shown in block 206, when the operator is "hands-on" a second signal from a programmable device is communicated to a first mechanism used to bypass or declutch a second mechanism for restricting the maximum rate of displacement of the active inceptor. The function of the second mechanism is to restrict the maximum rate of displacement of the inceptor to a specified value in response to any possible variation in forces applied by a third feedback mechanism for actively varying the force feel characteristics of the inceptor. The actions of block 206 allow inceptor force feel characteristics to vary rapidly enough to provide effective tactile cues during maneuvering flight. As shown in block 208, when the operator is "hands-off", a third signal from a programmable device is communicated to a second mechanism that restricts the maximum rate of displacement of an active inceptor to a specified safe and slow rate limit value no matter what forces are applied by the third feedback mechanism for actively varying the force feel characteristics of the inceptor. The actions of block 208 prevent the active inceptor from ever moving fast enough to be a safety hazard in the event of hardware failures or software anomalies.

It should be emphasized that the above-described embodiments, particularly, any "preferred" embodiments, are merely possible examples of implementations, merely set forth for a clear understanding of the principles of the disclosure. Many variations and modifications may be made to the above-described embodiments. All such modifications and variations are intended to be included herein within the scope of this disclosure and the present disclosure and protected by the following claims.

What is claimed is:

1. A system comprising:
an active inceptor configured to have mobility in at least a first direction;
a feedback mechanism in communication with the active inceptor and in communication with a programmable device, wherein the programmable device controls:
a level of force provided to the active inceptor via the feedback mechanism; and
a rate of change in the level of force (RoC) provided to the active inceptor via the feedback mechanism;
a first sensor in communication with the active inceptor and with the programmable device, wherein the programmable device is configured to determine, based on the first sensor, a state of the active inceptor where the state of the active inceptor is one of a hands-on state or a hands-off state;
wherein the programmable device is configured to provide a first RoC to the active inceptor via the feedback mechanism when the active inceptor is in the hands-on state;
wherein the programmable device is configured to provide a second RoC to the active inceptor via the feedback mechanism when the active inceptor is in the hands-off state; and
wherein the second RoC is less than the first RoC.

2. The system of claim 1, further comprising:
a second sensor in communication with the active inceptor and the programmable device, wherein the second sensor detects a position of the active inceptor relative to the first direction; and
a memory in communication with the programmable device, wherein the memory stores at least one tactile-cue position of the active inceptor, wherein the programmable device determines from information communicated by the second sensor and the memory whether the position of the active inceptor is one of the stored tactile-cue positions.

3. The system of claim 2, wherein the RoC provided by the programmable device is variable, whereby the RoC is a third RoC if the programmable device determines, from the information communicated by the second sensor and the memory, that the position of the active inceptor is at least proximate to one of the stored tactile-cue positions and a fourth RoC if the programmable device determines, from the information communicated by the second sensor and the memory, that the position of the active inceptor is not proximate to at least one of the stored tactile-cue positions; and
wherein the programmable device is configured to set the third RoC and the fourth RoC to be less than the first RoC when the active inceptor is in the hands-off state.

4. The system of claim 3, wherein the memory further stores a plurality of tactile-cue positions of varying significance and wherein, if the programmable device determines the position of the active inceptor is at least proximate to one of the stored tactile-cue positions, the RoC is varied respective of the significance of the tactile-cue position.

5. The system of claim 1, wherein in the hands-off state, movement of the active inceptor is limited to allow a pilot response to a failure from an erroneous signal received from a load sensor.

6. The system of claim 1, wherein in the hands-on state, the active inceptor is moveable rapidly in response to an aggressive pilot input or a rapid change in a flight condition.

7. A method for rate limiting force feedback on an active inceptor having mobility in a first direction, the method comprising:
controlling the active inceptor using a feedback mechanism and a programmable device, wherein the programmable device is configured to control:
a level of force at the active inceptor via a first signal to the feedback mechanism; and
a rate of change in the level of force (RoC) at the active inceptor via a third signal to the feedback mechanism;
determining, based on a first sensor, a state of the active inceptor where the state of the active inceptor is one of a hands-on state or a hands-off state;
controlling the active inceptor using the programmable device via the third signal when the active inceptor is in the hands-on state to a first maximum RoC;
controlling the active inceptor using the programmable device via the third signal when the active inceptor is in the hands-off state to a second maximum RoC wherein the first maximum RoC is higher than the second maximum RoC; and
communicating a second signal from the programmable device to the feedback mechanism, wherein the second signal changes the level of force provided to the active inceptor from the feedback mechanism in response to a change in one or more flight conditions.

8. The method of claim 7, further comprising:
detecting a position of the active inceptor relative to the first direction;
storing in a memory at least one tactile-cue position of the active inceptor; and
determining from the detected position and tactile-cue position stored in the memory whether the detected position of the active inceptor is one of the stored tactile-cue positions.

9. The method of claim 8, wherein the RoC is variable, wherein limiting the RoC at which the level of force provided to the active inceptor is changed further comprises limiting the RoC to a third rate if the detected position of the active inceptor is at least proximate to one of the stored tactile-cue positions and limiting the RoC to a fourth rate if the detected position of the active inceptor is not at least proximate to one of the stored tactile-cue positions; and
wherein the third rate and the fourth rate are less than the first RoC when the active inceptor is in the hands-off state.

10. The method of claim 9, further comprising storing a plurality of tactile-cue positions in memory and assigning each of the tactile-cue positions a varying level of significance, wherein if the detected position of the active inceptor is one of the stored tactile-cue positions, the RoC is varied respective of the level of significance of the tactile-cue position.

11. The method of claim 7, wherein in the hands-off state movement of the active inceptor is limited to allow a pilot response to a failure from an erroneous signal received from a load sensor.

12. The method of claim 7, wherein in the hands-on state, the active inceptor is moveable rapidly in response to an aggressive pilot input or a rapid change in a flight condition.

13. A method for rate limiting an active inceptor, the method comprising:
controlling the active inceptor using a feedback mechanism and a programmable device, wherein the programmable device controls a level of force and a rate of change in the level of force (RoC) provided to the active inceptor via the feedback mechanism;
determining, based on a first sensor, a state of the active inceptor where the state of the active inceptor is one of a hands-on state or a hands-off state;
controlling the active inceptor via the programmable device and via the feedback mechanism to a first RoC when the active inceptor is in the hands-on state;
controlling the active inceptor via the programmable device and via the feedback mechanism to a second RoC when the active inceptor is in the hands-off state, wherein the second RoC is less than the first RoC; and
limiting motion of the active inceptor based on the RoC.

14. The method of claim 13, further comprising:
detecting a position of the active inceptor;
storing in a memory at least one tactile-cue position of the active inceptor; and
determining from the detected position and tactile-cue position stored in the memory whether the detected position of the active inceptor is one of the stored tactile-cue positions.

15. The method of claim 14, wherein the RoC is variable, wherein setting the RoC further comprises setting the RoC to a third rate if the detected position of the active inceptor is one of the stored tactile-cue positions and setting the rate to a fourth rate if the detected position of the active inceptor is not one of the stored tactile-cue positions wherein the third rate and the fourth rate are less than the first RoC when the active inceptor is in the hands-off state.

16. The method of claim 15, further comprising storing a plurality of tactile-cue positions in memory and assigning each of the tactile-cue positions a varying level of significance, wherein if the detected position of the active inceptor is at least proximate to one of the stored tactile-cue positions, the RoC is varied respective of the level of significance of the tactile-cue position.

17. The method of claim 13, wherein in the hands-off state, movement of the active inceptor is limited to allow a pilot response to a failure from an erroneous signal received from a load sensor.

18. The method of claim 13, wherein in the hands-on state, the active inceptor is movable rapidly in response to an aggressive pilot input or a rapid change in a flight condition.

* * * * *